United States Patent
Dejongh et al.

(10) Patent No.: US 11,908,045 B2
(45) Date of Patent: Feb. 20, 2024

(54) ITERATIVE ALGORITHM FOR PROTON CT IMAGE RECONSTRUCTION

(71) Applicant: ProtonVDA LLC, Naperville, IL (US)

(72) Inventors: Don Frederic Dejongh, Batavia, IL (US); Ethan Alan Dejongh, Aurora, IL (US)

(73) Assignee: ProtonVDA LLC, Naperville, IL (US)

( * ) Notice: Subject to any disclaimer, the term of this patent is extended or adjusted under 35 U.S.C. 154(b) by 333 days.

(21) Appl. No.: 17/486,734

(22) Filed: Sep. 27, 2021

(65) Prior Publication Data

US 2022/0101572 A1 Mar. 31, 2022

Related U.S. Application Data

(60) Provisional application No. 63/084,424, filed on Sep. 28, 2020.

(51) Int. Cl.
*G06T 11/00* (2006.01)
(52) U.S. Cl.
CPC ........ *G06T 11/005* (2013.01); *G06T 2210/41* (2013.01); *G06T 2211/424* (2013.01)
(58) Field of Classification Search
CPC .................................................. G06T 11/005
See application file for complete search history.

(56) References Cited

U.S. PATENT DOCUMENTS

| | | | |
|---|---|---|---|
| 2012/0224760 A1* | 9/2012 | Goshen | G06T 5/003 382/131 |
| 2015/0279005 A1* | 10/2015 | Brendel | G06T 5/002 382/131 |
| 2022/0101572 A1* | 3/2022 | Dejongh | G06T 11/006 |
| 2023/0112738 A1* | 4/2023 | Chapdelaine | G06T 11/006 382/131 |

* cited by examiner

*Primary Examiner* — Oneal R Mistry
(74) *Attorney, Agent, or Firm* — Morrison & Foerster LLP

(57) ABSTRACT

Described herein is a system for 3D proton imaging encompassing both proton radiography (pRad) and proton CT (pCT). The disclosed system can reduce range uncertainties, while providing a fast and efficient check of patient set up and integrated range along a beam's eye view just before treatment. The disclosed system provides a complete solution to the range inaccuracy problem in proton therapy, substantially reducing the uncertainties of treatment planning by directly measuring relative stopping power without being affected by image artifacts and with much lower dose to the patient than comparable x-ray images. Also described herein is a proton imaging algorithm for prompt iterative 3D pCT image reconstruction, where each iteration is fast and efficient, and the number of iterations is minimized. The method offers a unique solution that optimally fits different protons and does not depend on the starting point for the first iteration.

20 Claims, 10 Drawing Sheets

ITERATIVE ALGORITHM FOR PROTON CT IMAGE RECONSTRUCTION

CROSS-REFERENCE TO RELATED APPLICATION

The application claims the benefit of U.S. Provisional Application No. 63/084,424, filed Sep. 28, 2020, the contents of which are incorporated herein by reference in its entirety for all purposes.

STATEMENT REGARDING FEDERALLY SPONSORED RESEARCH OR DEVELOPMENT

This invention was made with government support from the National Cancer Institute of the National Institutes of Health under Award Number R44CA243939. The government has certain rights in the invention.

FIELD

This disclosure generally relates to a proton CT image reconstruction, and more specifically, to an iterative algorithm for proton CT image reconstruction.

BACKGROUND OF THE INVENTION

In radiation therapy, protons provide a superior dose distribution compared to x-rays. This is because protons have a relatively low dose deposition in the entrance region (plateau), followed by a steep increase to a dose (Bragg) peak, and an even steeper distal dose fall-off. This well-defined range is the prime advantage of proton therapy over x-rays. It results in minimal dose to healthy tissues, thus causing fewer side effects and resulting in a better quality of life for the patient. However, this finite range of proton beams can also be a disadvantage when the patient's desired treatment location is uncertain. This uncertainty in treatment location may be due to several reasons.

For example, the use of x-ray imaging for treatment planning to obtain a map of relative stopping power (RSP) of tissues (relative to water) may be inaccurate due to the differences in the dependence of x-ray attenuation and proton energy loss on tissue composition (electron density and atomic number). This yields an inherently inaccurate conversion of x-ray Hounsfield units to proton RSP. There may also be uncertainties in patient set up, including alignment of the patient to the isocenter and deformations from non-rigid changes such as shoulder movements. Furthermore, changes in the position of a tumor during the patient's breathing cycle and anatomical changes of the patient during the course of fractionated treatments may increase the amount of uncertainty.

Current treatment planning procedures try to minimize the effects of these uncertainties by including uncertainty margins, selecting beam angles tangential to organs, and using dose delivery technologies such as Pencil Beam Scanning (PBS) and intensity-modulated proton therapy (IMPT). In PBS, a beam of proton radiation is steered and focused on the treatment location, thereby reducing unnecessary radiation exposure to surrounding non-cancerous cells. In IMPT, two or three proton beams are combined during each treatment to deliver individual dose distributions that add up to a highly conformal dose in the target volume and a much lower dose to organs (e.g., eyes, cranial nerves, parotid glands) at risk. Superior dose distribution and cost reduction in proton therapy can be achieved by using proton beam-based image guidance in procedures such as rapid online adaptive therapy. This technique is particularly helpful for hypo-fractionated treatments, which can benefit from more conformal dose distributions and a higher standard of safety given the high dose delivery for each treatment.

While planning treatment and dose delivery using the above techniques, the knowledge of the water equivalent path length (WEPL) of each ray, or pencil beam, from the skin to every point in the target is crucial. For protons, this length is estimated from RSP based on X-ray Hounsfield units. Unfortunately, such estimates lead to 3 to 4% uncertainties in the proton range prediction. Therefore, protons in the Bragg peak may overshoot (or undershoot) the desired stopping depth in the target causing tissue damage beyond the target volume.

The current algorithms for proton CT (pCT) image reconstruction in use involve iteratively moving towards an improved solution under broad sets of conditions. However, these algorithms suffer from the lack of a systematic framework, such as a definition of an optimal solution in the presence of measurement uncertainties, or the use of an arbitrary step size for each iteration. Explorations often incorporate additional smoothing algorithms such as median filtering or total variation superiorization, which can produce better-looking images with less noise but with unknown systematic effects, particularly when imaging complex objects with rapid density variations.

What is needed is a proton imaging system and algorithm that provide accurate three-dimensional (3D) images of RSP values from individual protons that pass through the body. What is also needed is a 3D pCT image reconstruction algorithm that optimally fits different protons and does not depend on the starting point for the initial iteration, where each iteration is fast and efficient, and the number of iterations is minimized.

BRIEF SUMMARY OF THE INVENTION

Described herein is an improved system for 3D proton imaging encompassing both proton radiography (pRad) and proton CT (pCT). Range uncertainties can be reduced with pCT, while pRad provides a fast and efficient check of patient set up and integrated range along a beam's eye view just before treatment. This provides a complete solution to the range inaccuracy problem in proton therapy. pCT substantially reduces the uncertainties of treatment planning by directly measuring RSP (the tissue property determining proton energy loss) without being affected by image artifacts and with much lower dose to the patient than comparable x-ray images. pRad may provide the capability to verify the range of individual proton beams before treatment. In summary, proton imaging with pCT and pRad may enable clinicians to fully utilize the advantages of proton radiotherapy.

Also described herein is a proton imaging algorithm for prompt iterative 3D pCT image reconstruction, where each iteration is fast and efficient, and the number of iterations is minimized. The method offers a unique solution that optimally fits different protons and does not depend on the starting point for the first iteration. The method also offers other advantages like not requiring a trade-off between optimizing spatial resolution and RSP resolution; the ability to define a direction for each iteration that takes into account the noise in the proton data arising from measurement uncertainties; the ability to define an optimal step size for each iteration individually; the ability to simultaneously optimize the step sizes of many iterations; the ability to divide the proton data into an arbitrary numbers of blocks, where the blocks can be as small as a single proton; the ability to optimize computing resources; the ability to define the stopping criteria for the iterations. While the disclosure herein is described in the context of proton imaging, it may be used for other ions, such as helium, and can also be applied to other tomographic modalities, such as x-ray imaging.

DETAILED DESCRIPTION OF THE INVENTION

Figure 1:
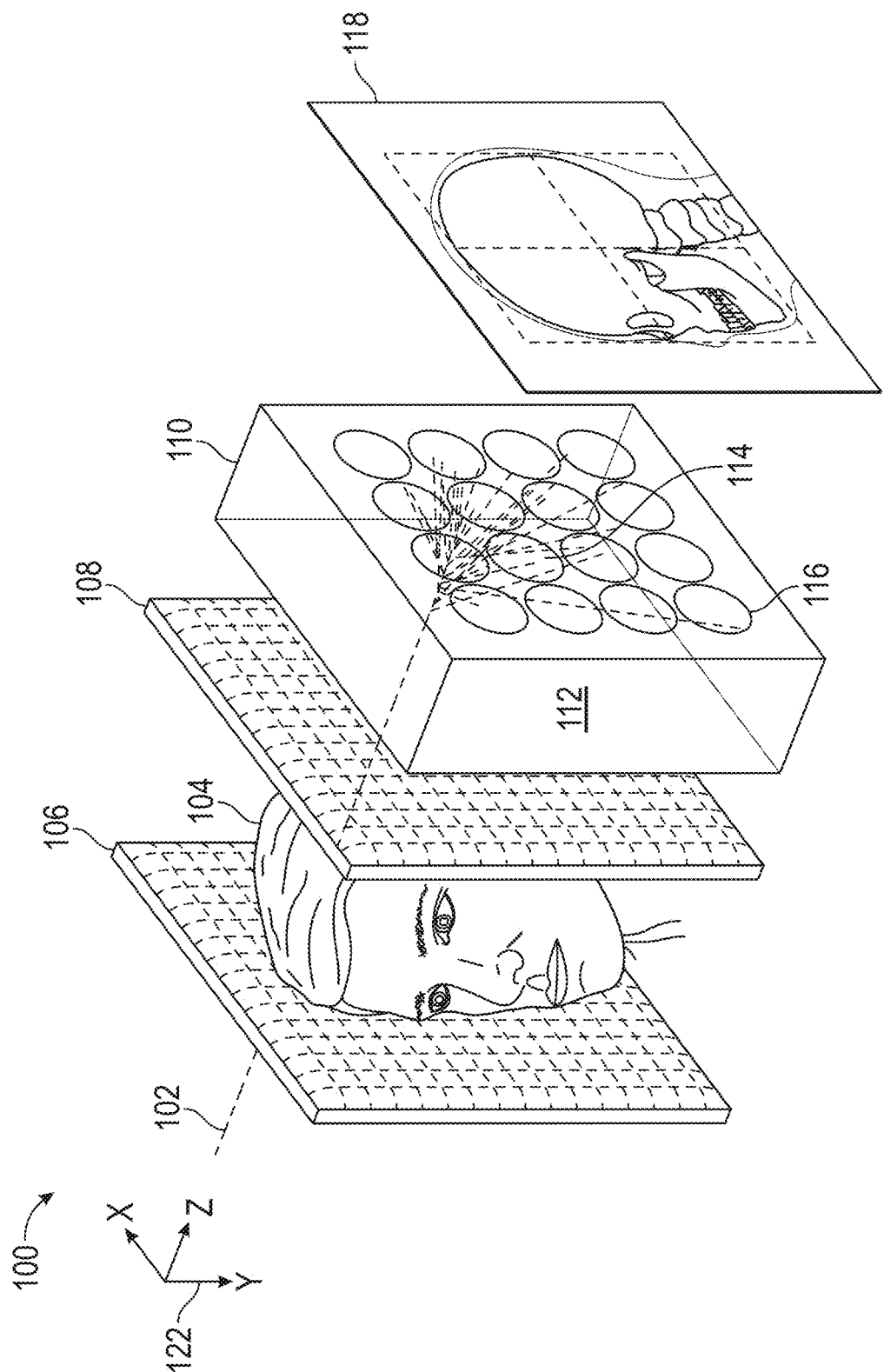
FIG. 1 illustrates a planar view of a block diagram of an exemplary proton imaging system, according to embodiments of the disclosure.

The following description is presented to enable a person of ordinary skill in the art to make and use various embodiments. Descriptions of specific devices, techniques, and applications are provided only as examples. These examples are being provided solely to add context and aid in the understanding of the described examples. It will thus be apparent to a person of ordinary skill in the art that the described examples may be practiced without some or all of the specific details. Other applications are possible, such that the following examples should not be taken as limiting. Various modifications in the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to a person of ordinary skill in the art, that one or more aspects and/or features described or referenced herein may be practiced without some or all of these specific details. In other instances, well-known process steps and/or structures have not been described in detail in order to not obscure some of the aspects and/or features described or referenced herein.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combination of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 depicts system 100, which is an embodiment of a proton imaging system according to the present disclosure. In some examples, a pencil beam 102 (alternatively, a broad beam could also be used with variations of the present technology) of protons (although other particles, such as heavy ions, could also be used) is generated or extracted from a source (e.g., source 202 of FIG. 2) and scanned across a field by a scanning element (e.g., scanning element 204 of FIG. 2). For example, pencil beam 102 is scanned across a region of interest of object 104, which is a human head in FIG. 1. The position of pencil beam 102 as it enters object 104 can be determined based on data from tracking detector 106 that generates photons at locations where protons traverse tracking detector 106, as described in more detail below. Similarly, the position of pencil beam 102 as it exits object 104 can be determined using data from tracking detector 108. Note that tracking detectors 106 and 108 are spaced apart to allow object 104 to be positioned between them. In some embodiments, only one tracking detector is needed, or two or more tracking detectors are used, on one or both sides of object 104. Potential architectures for tracking detectors 106 and 108 are described in more detail below.

Residual range detector 110 is positioned adjacent tracking detector 108. Residual range detector 110 includes scintillator material 112 (represented in FIG. 1 by a box). As a proton of pencil beam 102 enters scintillator material 112 through the surface facing tracking detector 108, the proton generates photons 114 (represented by dotted lines in FIG. 1) as the protons lose energy from interacting with scintillator material 112. These photons can then be collected by photon detectors (e.g., photon detector 224 of FIG. 2) coupled to scintillator material 112. The photon detectors may be coupled to the surface of scintillator material 112 that is opposite the surface facing tracking detector 108. The coupling of the photon detectors is depicted in FIG. 1 by circles 116. The signal generated by the photon detectors is proportional to a residual energy of a proton as it entered scintillator material 112. This information combined with the initial energy of the proton and the location of the proton as it entered and exited object 104, along with similar information for many additional protons, can be used to generate image 118 of object 104. By using multiple proton energies and/or protons at different angles (e.g., 100 different angles) in a proton tomography system using the present technology, 3D images can be produced.

Figure 2:
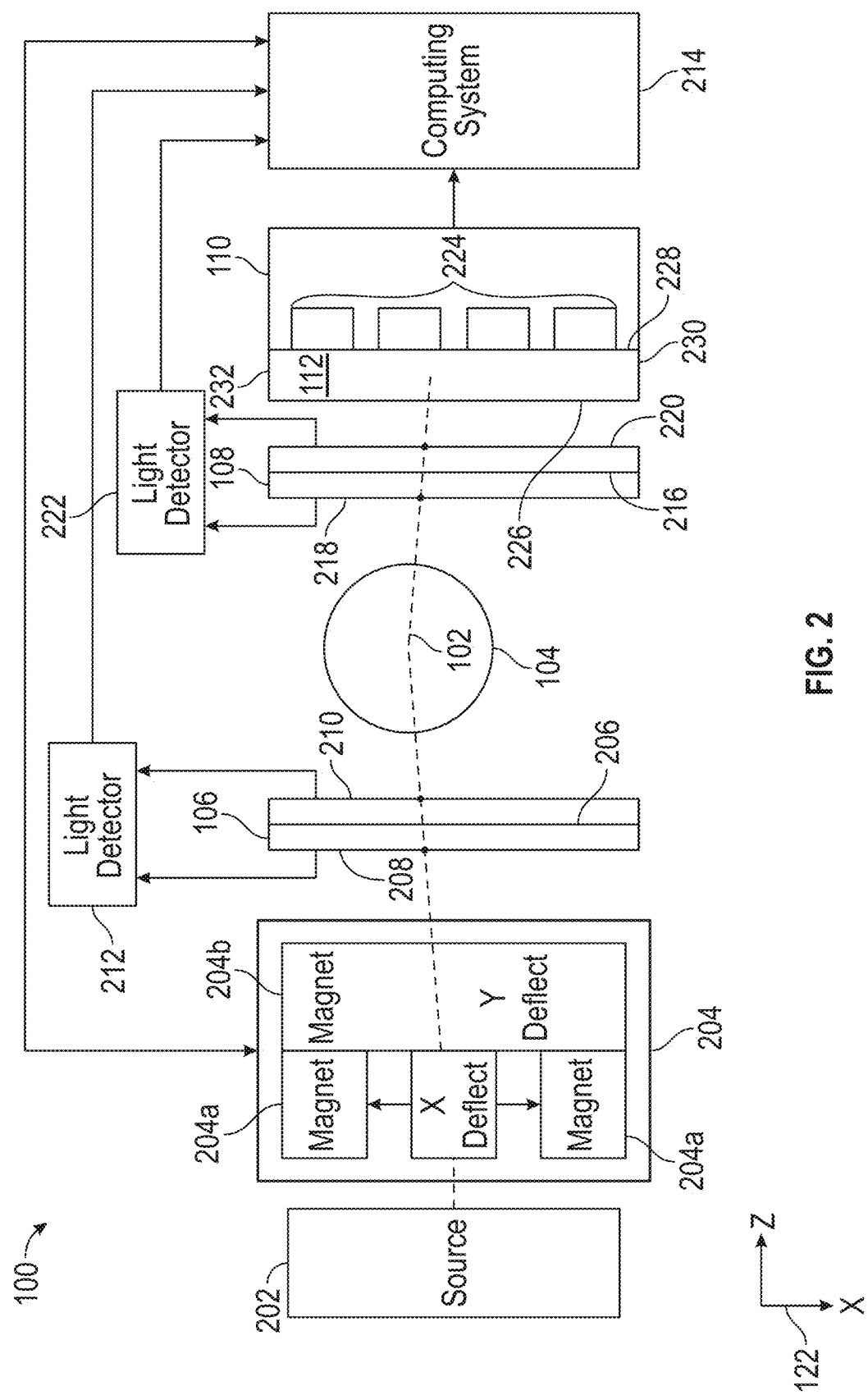
FIG. 2 illustrates a cross-sectional view of a block diagram of an exemplary proton radiography system, according to embodiments of the disclosure.

Note that reference axes 122 show that pencil beam 102 is traveling along the z-axis and tracking detectors 106 and 108 are perpendicular to the z-axis. FIG. 2 described below may be described with respect to the same reference axes.

FIG. 2 depicts system 100 of FIG. 1 with additional detail and from a different perspective, as indicated by reference axes 122. With reference to FIG. 2, system 100 includes source 202 that generates or extracts pencil beam 102. Scanning element 204 is used to steer pencil beam 102 and includes scanning magnets 204a and 204b. Scanning magnets 204a scan the pencil beam 102 in x-directions as defined with respect to reference axes 122, and scanning magnets 204b (the second of which is hidden in the perspective of FIG. 2) scan pencil beam 102 in y-directions, as defined with respect to respect to reference axes 122. In general, scanning element 204 is programmable such that pencil beam 102 is scan-able across the entirety of the field in any pattern, and, as determined by source 202, at any initial energy at any point in time. In this example, source 202 is capable of controlling or varying the initial energy of the protons of pencil beam 102. During a scan, the extent of the field is in general limited by the planar dimensions of first tracking detector 106, second tracking detector 108, or residual range detector 110 of system 100. Example field areas include 10×10 cm$^2$ to 38.4×38.4 cm$^2$.

By using a different initial energy at different transverse positions of the tracking detectors and the object being imaged, the depth of the residual range detector can be kept small. For example, the initial energies can be chosen to keep the residual range between 0 and 10 cm across the field to be imaged regardless of the thickness or density of the object along a particular path. The more range in initial energy that is possible, smaller residual range detectors may be possible.

In some examples of an architecture for tracking detector 106, as protons of pencil beam 102 traverse first tracking detector 106, the protons interact with fibers on either side of substrate 206. Specifically, each side of substrate 206 includes, for example, two layers of fibers, i.e., fibers 208 on one side and fibers 210 on the opposite side of substrate 206. Fibers 208 and 210 may be scintillating fibers so that when a proton impinges a fiber, the scintillating properties of the fiber may cause one or more photons to be generated. These photons are captured by light detector 212, which generates an electrical signal based on the detected photons. The electrical signal is transmitted to computing system 214. By knowing the location and orientation of fibers 208 and 210 that produced photons, the location of the proton that traversed tracking detector 106 may be determined by computing system 214. Additionally, computing system 214 may also use data from scanning element 204 to determine or verify the location where a proton passed through tracking detector 106. Once the location is known the initial directional vector of pencil beam 102 can also be determined based on the focal point of source 202.

As protons of pencil beam 102 traverse object 104, protons may be scattered, as is depicted in FIG. 2 as an exaggerated change in direction of pencil beam 102 in object 104. After the protons exit object 104, the exit location where protons traverse tracking detector 108 can be determined in a similar manner as described above with respect to tracking detector 106. Similar to tracking detector 106, tracking detector 108 includes fibers on substrate 216. Specifically, each side of substrate 216 includes, for example, two layers of fibers, i.e., fibers 218 on one side and fibers 220 on the other side of substrate 216. Fibers 218 and 220 may be scintillating fibers so that when a proton impinges a fiber, the scintillating properties of the fiber may cause one or more photons to be generated. These photons may be captured by light detector 222, which may generate an electrical signal based on the detected photons. The electrical signal is transmitted to computing system 214. By knowing the location and orientation of fibers 218 and 220 that produced photons, the location of the proton that traversed first tracking detector 108 may be determined by computing system 214. Additionally, computing system 214 may also use information from scanning element 204 to determine or verify the location on tracking detector 108 where a proton passed through tracking detector 108.

In some examples, fibers 218 are oriented perpendicular to fibers 220. If light detector 222 indicates that a proton passed through one fiber of fibers 218 and one fiber of fibers 220 and computing system 214 knows the location of these two fibers, computing system 214 can determine that the X-Y coordinate on tracking detector 108 where the proton traversed tracking detector 108 is at the intersection of the two fibers. Additionally, if fibers of fibers 218 or fibers of fibers 220 are connected together to reduce the number of detectors needed in light detector 222, then the estimated or expected position of pencil beam 102 based on data from or instruction sent to scanning element 204 may be used in determining the X-Y coordinate on tracking detector 108 where the proton traversed tracking detector 108.

While an exemplary architecture of a tracking detector has been described, embodiments of the disclosure may include other architectures. For example, if fibers are rigid enough, the fibers could be bonded together to avoid using a substrate. As another example, with respect to tracking detector 106, fibers 208 and 210 could be placed on the same side of substrate 206 or fibers 208 and 210 could be placed on separate substrates that are placed next to each other.

As protons of pencil beam 102 enter residual range detector 110, they impinge scintillator material 112 and generate photons that are collected by photon detectors 224 (while four photon detectors are depicted in FIG. 2, system 100 includes sixteen photon detectors as indicated by the circles representing the photon detectors couplings to scintillator material 112 in FIG. 1). Photon detectors 224 are, for example, photomultiplier tubes or other similar devices. Photon detectors 224 generate electrical signals based on the number of photons collected and generate electrical signals that are provided to computing system 214, which may calculate values such as total energy. Based on the electrical signals, and potentially other information (such as the X-Y coordinate of where a proton exited object 104 and traversed tracking detector 108), computing system 214 may determine a residual energy for a proton of pencil beam 102 that entered scintillator material 112 after exiting object 104.

Protons enter scintillator material 112 via surface 226. Generated photons are collected by photon detectors 224 as the photon exit surface 228 of scintillator material 112. The dimensions of scintillator material 112 may be selected to ensure that protons stop in scintillator material 112 as opposed to passing through scintillator material 112. This ensures that protons of pencil beam 102 generate a large number of scintillation photons within a few nanoseconds. Surface 226, surface 230, surface 232, and/or the other two surfaces of scintillator material 112 not depicted in FIG. 2 are, in some examples, covered (e.g., deposited, coated, or arranged next) with an anti-reflective or photon absorbing material. For example, the walls of scintillator material 112 are painted black. The anti-reflective material ensures that mainly direct photons that have not scattered off the walls of scintillator material 112 are collected at photon detectors 224. The anti-reflective material may include different materials on different surfaces of scintillator material 112. The anti-reflective material may absorb 90% or more of the photons that contact the material. The anti-reflective material adds to the high speed operation of system 100.

The use of multiple photon detectors also provides the potential to obtain additional position data for the location that a proton exited object 104. For example, with reference to FIG. 1, if photon detectors are coupled to scintillator materials 112 as indicated by circles 116 (sixteen total), the photon detector nearest where the photon entered scintillator material 112 should produce the strongest signal. If the position of the photon detector that produces the strongest signal does not correlate with the position indicated by the signals generated from tracking detector 108 and light detector 222, then an event that should be rejected may exist, such as inelastic scatter.

Figure 3:
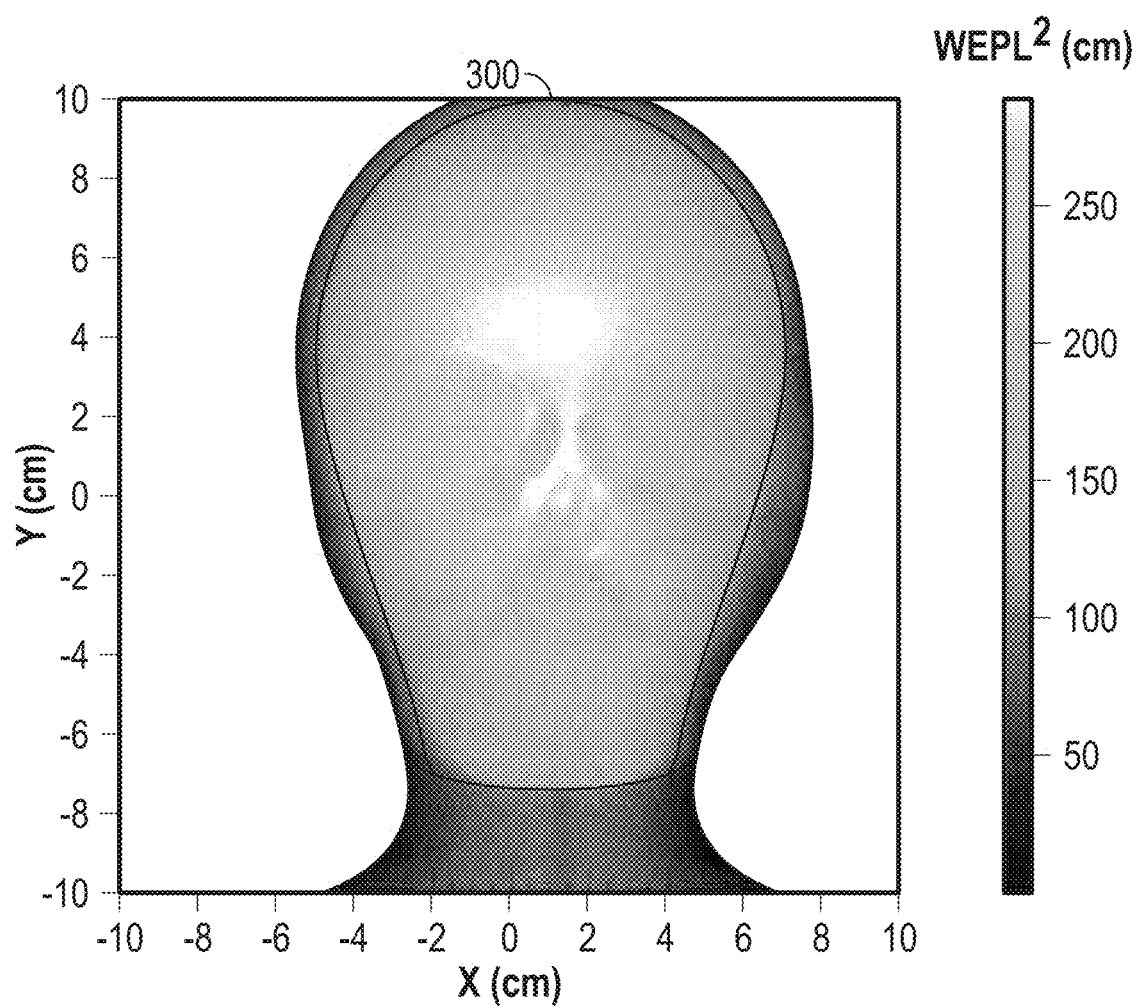
FIG. 3 illustrates an exemplary proton radiography image, according to embodiments of the disclosure.
Figure 4A:
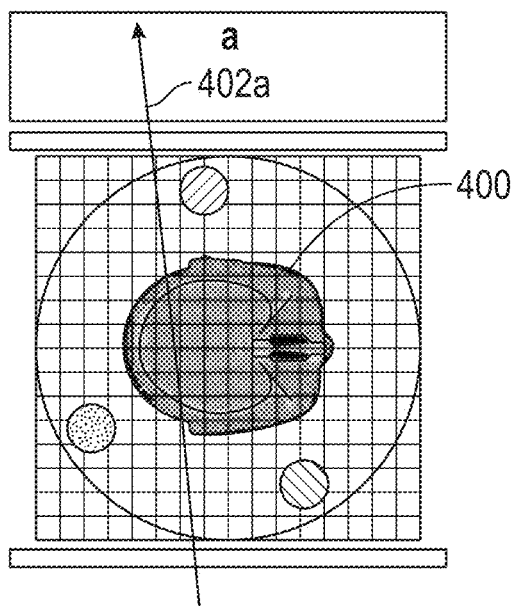
FIGS. 4A-4D illustrate exemplary images having different angles and used in constructing a three dimensional (3D) PCT image, according to embodiments of the disclosure.
Figure 4B:
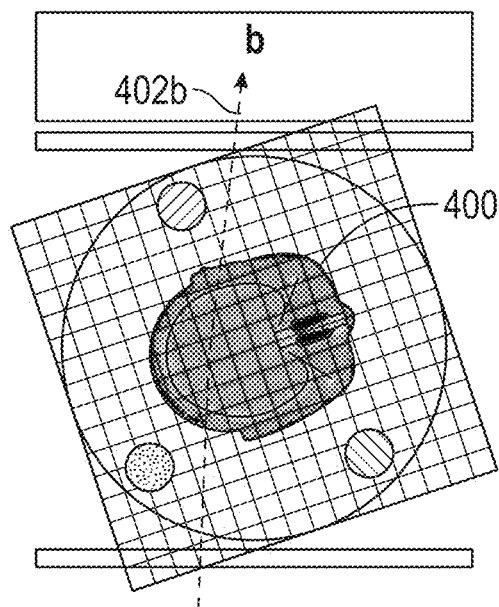
Figure 4C:
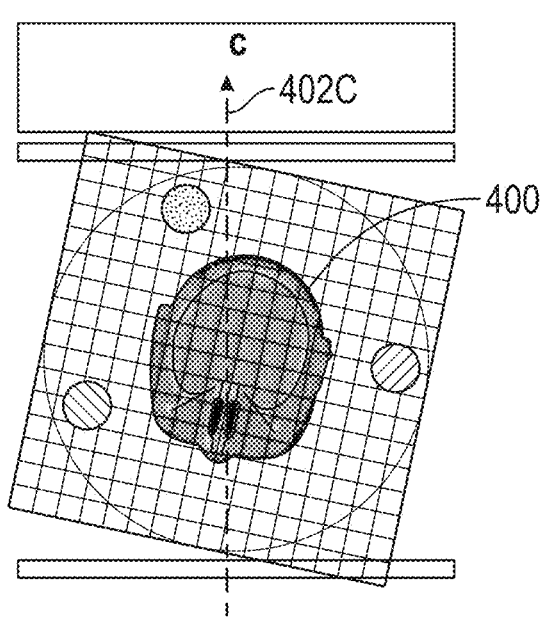
Figure 4D:
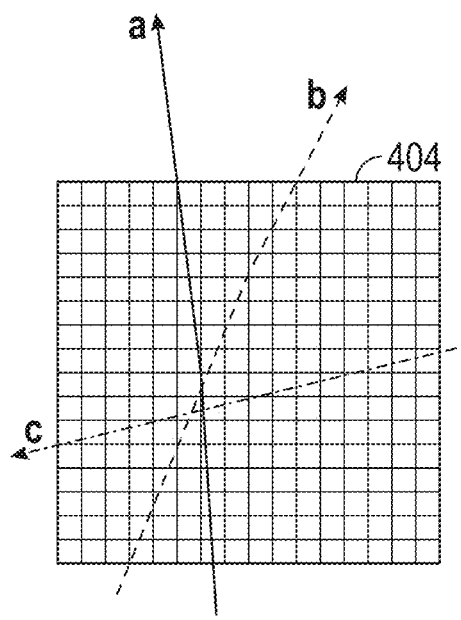

FIG. 3 illustrates a proton radiography image using data taken with multiple incoming proton energy beams. In some examples, the system 100 may be used to reconstruct a 3D pCT image by obtaining multiple images corresponding to multiple proton beams at different angles. To reconstruct the image 300, a 3D RSP map of the object 104 may be built by acquiring proton histories from a set of projection angles.

FIGS. 4A-4D illustrate examples of the different angles used for construction of a 3D PCT image. For example, protons 402a, 402b, and 402c may interact with the object 400 at different angles relative to detectors 106 and 108. For image reconstruction, the trajectories of protons 402a, 402b, and 402c may be placed in a single 3D coordinate grid 404, which may move with the object 400. In some examples, markers on a rotating platform can help determine the rotation angle.

Proton beam trajectories may deviate from straight lines due to multiple Coulomb scattering, which may blur images. In some examples, this limitation can be overcome by measuring each proton trajectory individually to estimate its most likely path, along with its energy loss quantified as WEPL, and then applying an iterative reconstruction algorithm. After obtaining the data from multiple protons beams, the iterative reconstruction algorithm may be used to adjust the RSPs touched by the protons to match the residual range of protons. In some examples, the iterative algorithms to reconstruct the images may be implemented using parallel processing on central processing unit (CPU)/general processing unit (GPU) computers. Additionally or alternatively, data acquisition and image reconstruction may be combined to promptly display images accurately in terms of water equivalent thickness (WET) or RSP.

In an exemplary proton radiography system, the problem of reconstructing the pCT image may be stated as a matrix relationship:

$$Ax = b \qquad (1)$$

where b represents a vector including the WEPL measurements. The b vector may include one entry for each proton, and x represents a vector including the RSP for each voxel. A may represent a matrix comprising one row for each proton and one column for each voxel. In some embodiments, each entry in the A matrix is the chord length of the proton trajectory through the voxel. In some embodiments, each proton may touch only a tiny fraction of the voxels, making the A matrix quite sparse. Embodiments of the disclosure may include a pCT reconstruction algorithm that solves for x, as stated in the relationship (1).

Figure 5:
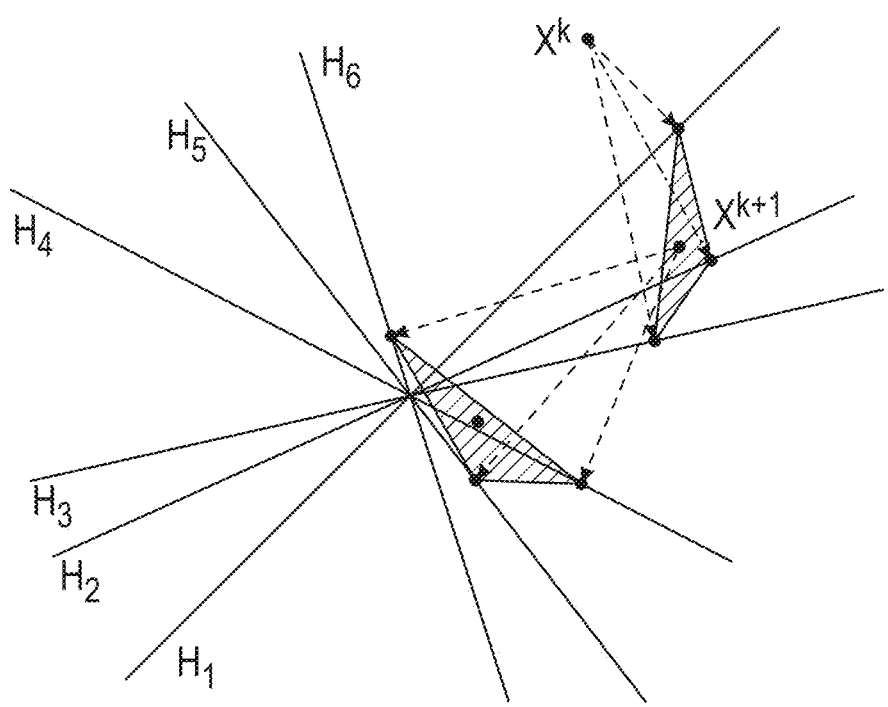
FIG. 5 illustrates an exemplary projective picture used in iterative algorithms, according to embodiments of the disclosure.

Current iterative algorithms rely on a projective approach, as illustrated in FIG. 5, where repeated projections converge towards a solution for Ax=b, consistent with each proton. In this picture, the projective approach is used to obtain a solution for Ax=b for the case of two voxels, where the coordinates in the plane represent possible solutions for the two entries in the x vector. The lines H1-H6 represent hyperplanes, each defined by a relationship obtained from one row of the A matrix multiplied by the x vector. The example shown in FIG. 5 is noiseless and is converging to a solution consistent for each proton.

The shortcoming with using a projective approach when used for pCT is that each proton has a measurement uncertainty, typically a factor 300 times greater than the precision of the solution, based on a 3 mm WEPL uncertainty and a voxel size of 1 mm with a goal of a 1% RSP measurement. The RSP precision is arrived at through the averaging effect of typically 100,000 protons touching each voxel. The correct picture would not show all the protons converging at a single point, but rather a spread out set of lines with an iteration deep inside a noise cloud converging towards a best fit point.

Exemplary Method for Reconstructing A PCT Image

Figure 6:
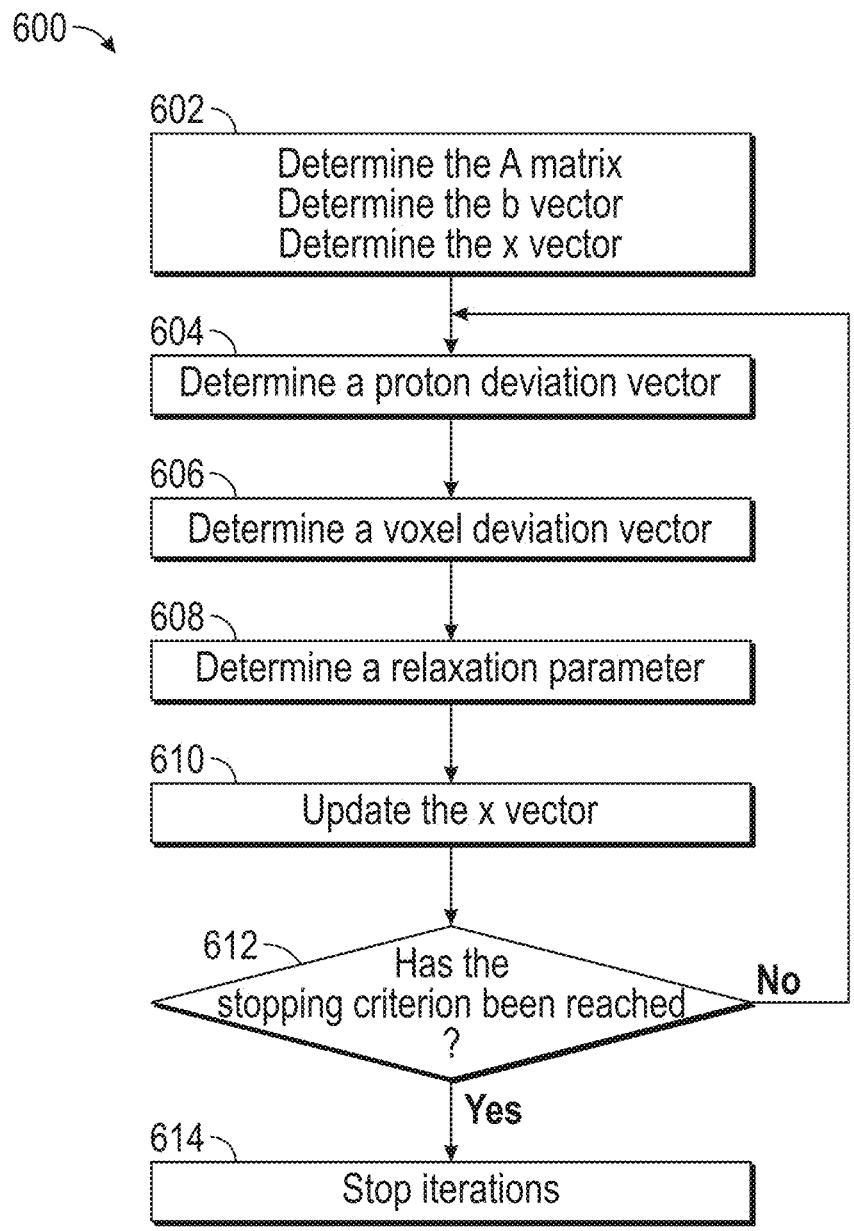
FIG. 6 illustrates a flow chart for an exemplary iterative algorithm for PCT image reconstruction, according to embodiments of the disclosure.

FIG. 6 illustrates an iterative algorithm for PCT image reconstruction according to examples of the disclosure. In some examples, a typical pCT image may require reconstructing a plurality of voxels (e.g., a few million voxels) using a plurality of protons (e.g., a few hundred million protons), each with a WEPL measurement with uncertainty (e.g., approximately 3 mm uncertainty).

Process 600 may include step 602, where an A matrix, a b vector, and a candidate x vector may be provided, according to the relationship (1) above. In such instance, the A matrix may be "tall and skinny" and may not have a solution that perfectly fits all protons. In step 604, a proton deviation vector may be represented as:

$$d_p = Ax - b \qquad (2)$$

where $d_p^i$ (or $d_{pi}$) represents the deviation for a given proton i. In some embodiments, the proton deviation vector $d_p$ may be a non-zero value.

In step 606, a voxel deviation vector $d_v$ may be determined. In some embodiments, the voxel deviation vector $d_v$ may be represented as a weighted (e.g., unbiased) average of the proton deviations $d_{pi}$ of all the protons going through each voxel, where $d_v^i$ (or $d_{vi}$) represents the deviation for a given voxel i.

In step 608, a relaxation parameter λ may be determined. In step 610, the system may update each voxel using the voxel deviation vector:

$$x \to x - \lambda d_v \quad (3)$$

In step 612, the system may evaluate whether a stopping criterion has been reached. If yes, the PCT image reconstruction may be determined to be complete and in step 614 the iterations may be stopped. If not, the system may loop back to step 604 and a proton deviation vector may again be determined.

In some examples, the weighted average of the proton deviation vector $d_p$ may be calculated using the chord lengths a of the protons as the weights. The deviation for a voxel may be written as:

$$\Sigma a_i d_{pi} / \Sigma a_i \quad (4)$$

where the $a_i$ represents the chord lengths for each proton. In some embodiments, the sum for representation (4) may taken over all protons touching the voxel.

The weights may be further optimized, for example, by incorporating a variable precision for the WEPL measurement of each proton. In some examples, the weights may be chosen to enhance spatial resolution. As multiple coulomb scattering may increase the uncertainty of the proton position as the proton goes deeper into the object, protons entering one side of an object may provide better spatial resolution than protons exiting that side of the object. For a given voxel, using larger weights for protons expected to provide better spatial resolution may enhance the sharpness of the image.

The above described voxel deviation vector $d_v$ may be written in terms of the A matrix as:

$$d_{vi} = (A^T d_p)_i / \Sigma_j \alpha^T_{ij} \quad (5)$$

$$d_{vi} = (A^T_i / \Sigma_j \alpha^T_{ij}) d_p \quad (6)$$

where $\alpha^T_{ij}$ are elements of $A^T_i$ which is the $i^{th}$ row of $A^T$. The $\overline{A}^T$ matrix may be stated as:

$$\overline{A}^T_i = A^T_i / \Sigma_j \alpha^T_{ij} \quad (7)$$

The voxel deviation vector $d_v$ may then be written as:

$$d_v = \overline{A}^T d_p \quad (8)$$

The DV method is an example of a general Landweber iterative method, for which broad convergence conditions have been established, where:

$$\overline{A}^T = V^{-1} A^T \quad (9)$$

$$V^{-1} = \text{diag}(1/\Sigma_j \alpha^T_{ij}) \quad (10)$$

The Censor algorithms are also examples of general Landweber iterative methods, where:

$$\overline{A}^T = A^T W \quad (11)$$

$$W = \text{diag}(1/\Sigma_j \alpha^2_{ij}) \quad (12)$$

The conventional least squares solution of relationship (1) would solve the following relationship for the x vector:

$$A^T A x - A^T b = 0 \quad (13)$$

With the weights, this is slightly modified as:

$$\chi^2 = d_p \cdot d_p \quad (14)$$

$$\chi^2 = (Ax - b) \cdot (Ax - b) \quad (15)$$

$$d\chi^2 / dx_i = 2 A^T_i (Ax) - 2 A^T_i b \quad (16)$$

where $d\chi^2/dx_i$ corresponds to the gradient used in Landweber iteration. To obtain the least squares solution set:

$$d\chi^2 / dx_i = 0 \quad \forall i \quad (17)$$

$$A^T_i \cdot A x - A^T_i \cdot b = 0 \quad (18)$$

Dividing by $\Sigma_j \alpha^T_{ij}$ throughout, applying relationship (7), and converting to matrix notation may result in:

$$\overline{A}^T A x - \overline{A}^T b = 0 \quad (19)$$

Applying relationships (8) and (2), this is equivalent to:

$$d_v = 0 \quad (20)$$

The iteration in relationship (4) converges toward a unique solution that optimizes the fit of the final image to the proton data.

Exemplary Method for Determining the Relaxation Parameter

The steps to execute for an iteration k+1 may be written as:

$$d_{pk} = A x_k - b \quad (21)$$

$$d_{vk} = \overline{A}^T d_{pk} \quad (22)$$

$$x_{k+1} = x_k - \lambda_k d_{vk} \quad (23)$$

$$d_{p(k+1)} = A x_{k+1} - b \quad (24)$$

$$d_{v(k+1)} = \overline{A}^T d_{p(k+1)} \quad (25)$$

In some embodiments, the relaxation parameter $\lambda_k$ may be determined before the computationally costly matrix-vector multiplications in relationships (24) and (25) can be executed. The value of $x_{k+1}$ from relationship (23) may be used in relationship (24), and then relationship (24) may be used in relationship (25) as follows:

$$d_{p(k+1)} = d_{pk} - \lambda_k A d_{vk} \quad (26)$$

$$d_{v(k+1)} = d_{vk} - \lambda_k \overline{A}^T (A d_{vk}) \quad (27)$$

In some embodiments, the system may perform the computationally costly matrix-vector multiplications $A d_{vk}$ and computations for $\overline{A}^T (A d_{vk})$ before choosing a value for the relaxation parameter $\lambda_k$. In some embodiments, the resulting vectors may be used in choosing the value of the relaxation parameters $\lambda_k$.

Embodiments of the disclosure may include choosing a relaxation parameter $\lambda_k$ by minimizing chi-squared $\chi^2_{k+1}$. The minimization of chi-square may include the following relationships:

$$\chi^2_{k+1} = d_{p(k+1)} \cdot d_{p(k+1)} \quad (28)$$

$$\chi^2_{k+1} = d_{pk} \cdot d_{pk} - 2 \lambda_k d_{pk} \cdot (A d_{vk}) + \lambda^2_k |A d_{vk}|^2 \quad (29)$$

$$\chi^2_{k+1} = \chi^2_k - 2 \lambda_k d_{pk} \cdot (A d_{vk}) + \lambda^2_k |A d_{vk}|^2 \quad (30)$$

$$d\chi^2_{k+1} / d\lambda_k = -2 d_{pk} \cdot (A d_{vk}) + 2 \lambda_k |A d_{vk}|^2 = 0 \quad (31)$$

$$\lambda_k = d_{pk} \cdot (A d_{vk}) / |A d_{vk}|^2 \quad (32)$$

The relaxation parameter may be determined by setting the sum of the voxel deviation equal to zero (i.e., $\Sigma d_{v(k+1)} = 0$).

$$\lambda_k = \Sigma d_{vk} / \Sigma \overline{A}^T (A d_{vk}) \quad (33)$$

The square of the voxel deviation vector $d_{v(k+1)} \cdot d_{v(k+1)}$ may be minimized, and the relaxation parameter may be determined.

$$\lambda_k = d_{vk} \cdot (\overline{A}^T A d_{vk}) / |\overline{A}^T A d_{vk}|^2 \quad (34)$$

Then, the mode of the k+1 voxel deviation vector $d_{v(k+1)}$ may be set equal to 0.

It may not be computationally costly to search for the value of the relaxation parameter $\lambda_k$ that achieves this condition. With a provisional choice of the relaxation parameter $\lambda_k$ the values of $d_{v(k+1)}$ can be binned into a histogram according to relationship (27). Additional choices of the relaxation parameter $\lambda_k$ may be attempted based on the previous values of the mode until the mode of the histogram is within one bin of 0.

In some examples, the optimal relaxation parameter can vary over two orders of magnitude from iteration to iteration, and the traditional method of choosing a constant relaxation parameter $\lambda$ may be quite ineffectual. In some embodiments, if most voxels have a voxel deviation vector $d_v$ far from 0, a smaller relaxation parameter $\lambda$ may be used since each proton may be affected by many voxels. In some embodiments, if only a small number of voxels have a voxel deviation vector $d_v$ far from 0, a larger relaxation parameter $\lambda$ may be used. In this situation, a constant relaxation parameter $\lambda$ may result in a very gradual movement towards the optimal solution. It may be beneficial to use relationship (33), relationship (34), or set the mode to 0, especially when $\Sigma d_{v(k+1)}$ departs significantly from 0. In some examples, different methods of choosing relaxation parameter $\lambda_k$ may be combined at different iterations.

Figure 7A:
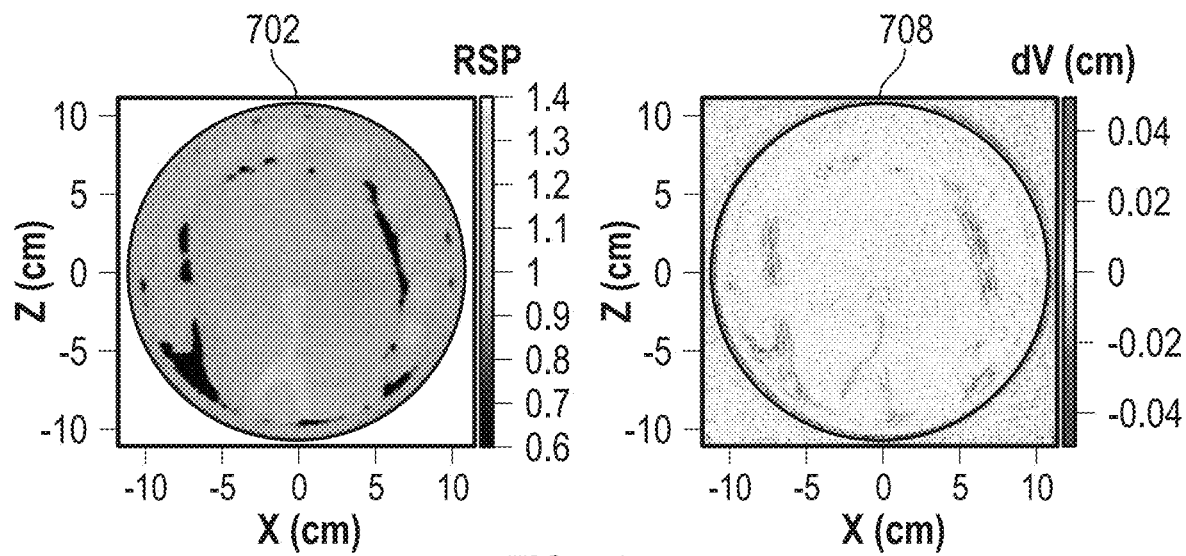
FIGS. 7A-7C illustrate exemplary pCT image slices taken using the proton radiography system and corresponding reconstructed images, according to embodiments of the disclosure.
Figure 7B:
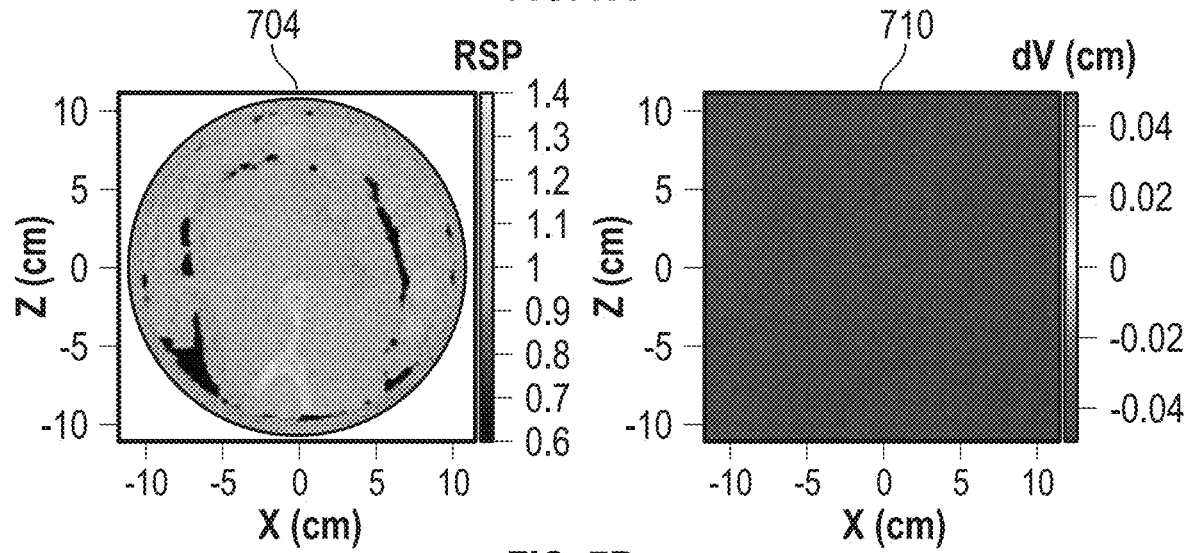
Figure 7C:
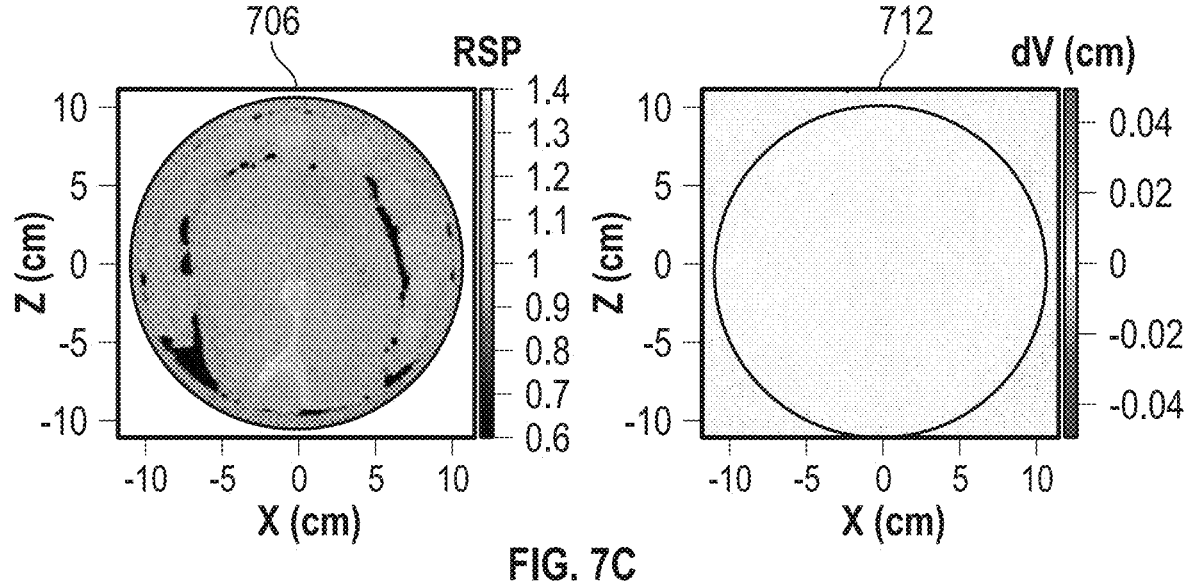

FIGS. 7A-7C illustrate pCT image slices of a pork shoulder and ribs taken using the proton radiography system according to the examples of the disclosure. The image slices 702, 704 and 706 are shown on the left with their respective voxel deviation vector $d_v$ 708, 710, 712 on the right. The image slice 702 of FIG. 7A depicts iteration 24 at which a large relaxation parameter $\lambda$ was prescribed to go to iteration 25. The image slice 704 of FIG. 7B depicts iteration 25 at which a voxel deviation vector $d_v$ increased overall, although $\chi^2$ improved a lot and the image became sharper. The image slice 706 of FIG. 7C depicts iteration 48 at which a voxel deviation vector $d_v$ was very low overall. In some examples, after a few iterations, the largest deviations are usually around the edges. The use of relationship (33) can enable a subsequent large step that results in images sharper than attainable with previous approaches, as seen with image 706, which is quantified as being very close to the optimal solution.

Figure 8:
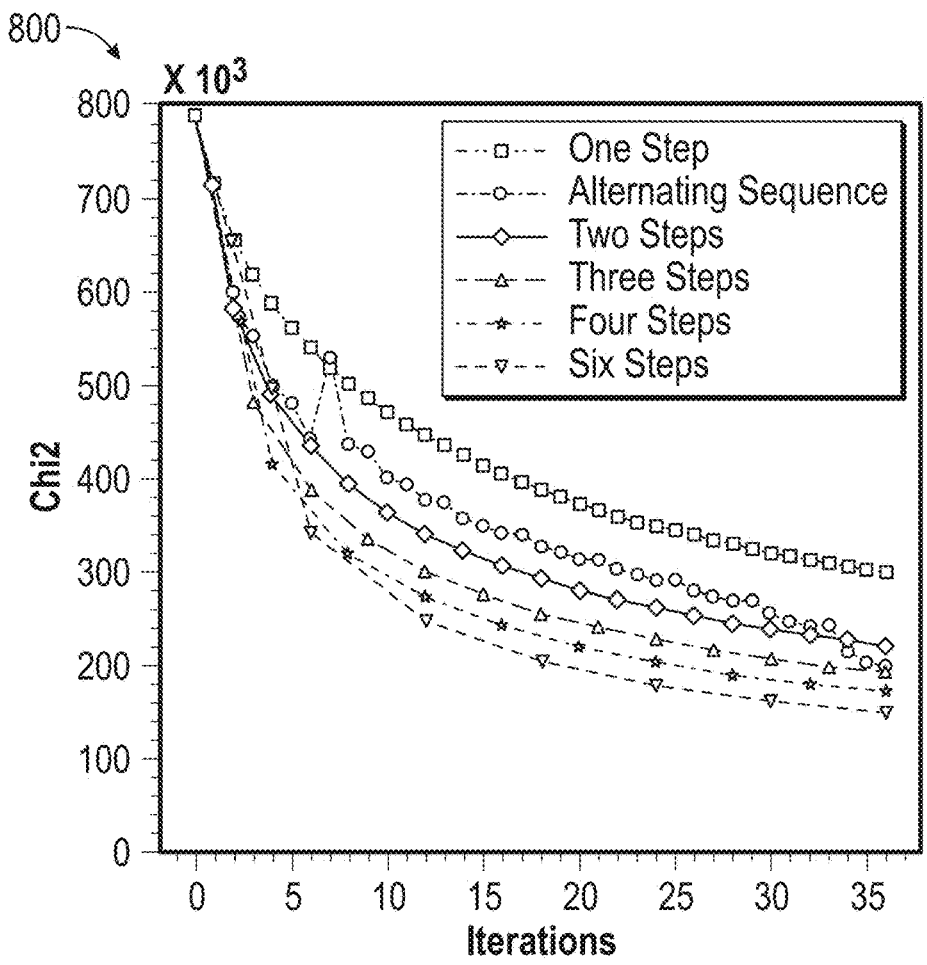
FIG. 8 illustrates exemplary plots of chi-square as a function of number of iterations for different step sizes, according to embodiments of the disclosure.

Embodiments of the disclosure may include alternating between different relaxation parameters, referred to as an alternating sequence. For example, the system may alternate between relationships (32) and (34). As shown in FIG. 8, the alternating sequence may produce better convergence than relationship (32) only.

Global Optimization of Many Iterative Steps

In some examples, the technique described in relationships (26) and (27) can be generalized to defer the choice of relaxation parameters for an arbitrary number of steps, and the combination of these steps can be globally optimized. For example, p and v vectors may be related as follows:

$$p_0 = d_{p0} \quad (35)$$

$$v_k = \overline{A}^T p_k \quad (36)$$

$$p_{k+1} = A v_k \quad (37)$$

It is evident by induction from relationships (35) to (37), the proton deviation vector $d_p$, and the voxel deviation vector $d_v$ can be written as a sum of the p and v vectors with the same coefficients $\kappa$ for any number of iterations n:

$$d_{pn} = p_0 + \Sigma_{i=1}^n \kappa_i^n p_i \quad (38)$$

$$d_{vn} = v_0 + \Sigma_{i=1}^n \kappa_i^n v_i \quad (39)$$

The solution x vector may also be written as a sum of v vectors with coefficients $\kappa^x$:

$$x_n = x_0 - \Sigma_{k=0}^{n-1} \lambda_k d_{vk} \quad (40)$$

$$x_n = x_0 + \Sigma_{i=0}^{n-1} \kappa_i^{xn} v_i \quad (41)$$

It may be demonstrated that $\kappa^x$ and $\kappa$ are the same by comparing the relationships (24) and (26) and applying relationship (41):

$$d_{pn} = d_{p0} - \Sigma_{k=0}^{n-1} \lambda_k A d_{vk} \quad (42)$$

$$d_{pn} = d_{p0} - A \Sigma_{k=0}^{n-1} \lambda_k d_{vk} \quad (43)$$

$$d_{pn} = p_0 + \Sigma_{i=1}^n \kappa_i^n A v_{i-1} \quad (44)$$

$$d_{pn} = d_{p0} - A(x_0 - x_n) \quad (45)$$

$$d_{pn} = d_{p0} + A(\Sigma_{i=0}^{n-1} \kappa_i^{xn} v_i) \quad (46)$$

$$d_{pn} = p_0 \Sigma_{i=0}^{n-1} \kappa_i^{xn} p_{i+1} \quad (47)$$

$$d_{pn} = p_0 \Sigma_{i=1}^n \kappa_{i-1}^{xn} p_i \quad (48)$$

Comparing relationships (44) and (48) result in:

$$\kappa_{i-1}^{xn} = \kappa_i^n \quad (49)$$

The solution x vector can then be written as:

$$x_n = x_0 + \Sigma_{i=1}^n \kappa_i^n v_{i-1} \quad (50)$$

The $\chi^2$ after n iterations is:

$$\chi^2 = d_{pn} \cdot d_{pn} \quad (51)$$

$$\chi^2 = (\Sigma_{i=0}^n \kappa_i^n p_i) \cdot (\Sigma_{i=0}^n \kappa_i^n p_i) \quad (52)$$

$$\chi^2 = \Sigma_{i,j=0}^n \kappa_i^n \kappa_j^n p_i \cdot p_j \quad (53)$$

where $\kappa_0^n = 1$ $\chi^2$ may be minimized to determine the values of $\kappa_i^n$ corresponding to the solution closest to the optimum. Since the image vector $x_n$ can be constructed directly from the $\kappa_i^n$ and the v vectors, as shown in relationship (50), there is no need to find the individual relaxation parameters. For example, one method of minimizing $\chi^2$ may be based on setting the gradient of $\chi^2$ to 0:

$$d\chi^2/d\kappa_i^n = 2\Sigma_{j=0}^n \kappa_j^n p_i \cdot p_j = 0 \quad (54)$$

$$p_i \cdot p_0 + \Sigma_{j=1}^n \kappa_j^n p_i \cdot p_j = 0 \quad (55)$$

Stating $P^n$ as the array of $p_i \cdot p_j$, $k^n$ as the vector of $\kappa_j^n$, and $p^n$ as the vector of $-p_i \cdot p_0$, the problem reduces to solving for $k^n$ for the following relationship.

$$P^n k^n = p^n \quad (56)$$

Alternatively, $\chi^2$ can be determined from the voxel deviation vector of the $n_{th}$ iteration $d_{vn}$. Since, as described above, the voxel deviation vector of the $n_{th}$ iteration $d_{vn} = 0$ for the optimal result, the following should lead to a similar solution as relationship (56):

$$\chi^2 = d_{vn} \cdot d_{vn} \quad (57)$$

$$V^n k^n = v^n \quad (58)$$

In some examples, the entries for A matrix and b vector are usually defined in mm, and the entries for the x vector have no units. With repeated iterations, the resulting vectors often increase rapidly in magnitude. In theory, this may not be a problem, but in practice this increase may affect the numerical stability of the solution of relationship (56) or relationship (58). This problem may be resolved by using a length scale that maintains roughly constant magnitudes as the mathematical unit. This can be found with a few trials after the iterations are finished but before solving relationship (56) or relationship (58). The length of the reconstruction volume may be a good first guess.

FIG. 8 illustrates exemplary plots of chi-square as a function of number of iterations for different step sizes, according to embodiments of the disclosure. The graph 800 depicts $\chi^2$ versus iteration number for a variety of strategies, optimizing step sizes simultaneously for different numbers of iterations. In some examples, optimizing many iterations simultaneously may reduce the number of iterations needed to reduce $\chi^2$ to a given level. In some embodiments, alternating between use of relationships (56) and (58) may also help reduce the number of iterations needed, in analogy to the alternating sequence shown for the single step case.

Exemplary Determination of Stopping Criteria

The above methods optimize the $\chi^2$ of the solution after a number of iterations, and this $\chi^2$ can then be used to evaluate whether further iterations are needed or if the current solution is close enough to the optimal solution. For example, worker processes may be continuously producing additional iterations of the p and v vectors while a parallel executive process may find the optimal coefficients and may evaluate the quality of the fit.

In some examples, a $\chi^2$ per degree of freedom may be determined, which may also be interpreted as the average deviation per proton, using $\chi^2$ from relationship (51):

$$\sigma_p = (\chi^2/(N_p - N_v))^{1/2} \quad (59)$$

where $N_p$ is the total number of protons and $N_v$ is the total number of voxels. With $N_{pv}$ as the average number of protons touching a voxel, obtained from the data, and c as the average chord length of a proton through a voxel (approximating this as the length of the side of a voxel is a sufficient approximation), an estimated average voxel precision may be stated as:

$$\sigma_v = \sigma_p/c(N_{pv})^{1/2} \quad (60)$$

In some examples, if a region of the image is known to have uniform RSP, the estimated voxel precision may be determined from the image in that region, but in general the estimate in relationship (60) has the advantage of not requiring assumptions about the RSP distribution.

At the minimum $\chi^2$, $\sigma_p \approx 2\text{-}3$ mm may be expected, based on the WEPL precision per proton, although in practice it may be somewhat larger, especially if the image has many non-uniform regions or sharp boundaries. As shown in relationship (20), it expected to have the voxel deviation vector $d_v = 0$ at the minimum. In some examples, for a given iteration, if the root-mean-square (r.m.s) of the voxel deviation vector $d_v$ is less than the estimated average voxel precision, it may be justified to stop iterating, since the noise from the proton measurement uncertainties is greater than the remaining distance to the optimal solution.

In some examples, the criteria used in deciding whether to stop the iterations may include r.m.s. $d_v < f \sigma_v$ (where f may lie in the range of 0.2 to 0.5); $\sigma_p < c$ mm, or no longer declining (where c mm may be proportional to the WEPL precision per proton); Max $|d_v| < c_v$ (try to avoid major outliers); Max|sum of $d_v$ over n×n×n voxel volume|$< c_v$ Exemplary Methods for Memory Use Memory resources can be a bottleneck in the implementation of the methods described according to the examples of the disclosure. In some examples, while the A matrix may be large, it may be sparse as each proton may touch only a small number of voxels. This sparsity of the A matrix may be used to store data in a compact manner. For example, the entries in the A matrix may be stored as lists of voxels with chord lengths for each proton, or as lists of protons with chord lengths for each voxel.

In some examples, in the case where entries in the A matrix are stored as lists of voxels with chord lengths for each proton, the geometry to store this information with much less memory can be taken advantage of. For example, each proton may have a list of line segments that can be used to recreate the chord lengths when needed. Each line segment should be short enough that a straight line approximates the proton trajectory to appropriate accuracy within the segment. In some examples, each proton can have a list of chord lengths, each typically stored in one byte, and a second list of base-6 numbers, stored in 4-byte integers with 12 base-6 numbers included in each 4-byte integer. Starting from a given voxel, the first base-6 number specifies the voxel face that the proton exits, and thus the identity of the next voxel, and subsequent base-6 numbers continue the chain from there. Thus, the chord lengths can be associated with the correct voxel.

Exemplary Methods for Parallel Processing

In some examples, the algorithm for pCT image reconstruction, may be parallelized by dividing the data into blocks of protons and combining the results from the different blocks. In some other examples, the worker processes may find a solution for each block of data, and a foreman process may receive all the solutions, combine them, and send the combined solution back to the worker processes for a further iteration.

The drawback with the above approaches is that each block of protons must be large enough to solve the image, and the combined solution may not necessarily approach a unique optimal solution. In some examples, a new parallelization strategy for the DV method may be used. These strategies may use blocks with arbitrarily small numbers of protons, and generate results as if the calculations were executed in a single block.

In some examples, the computationally costly part of each full iteration may involve a sequence of two matrix-vector multiplications for either $\overline{A}^T(Ad_{vk})$ or $\overline{A}^T(Av_k)$, as described above. In a matrix-vector multiplication, each row of the matrix multiplies the vector independently. In some embodiments, all the row-vector multiplications may be performed in parallel, a task well suited to GPUs. These multiplications may be performed using the following strategies.

Exemplary Row-Column DV (RCDV)

Figure 9:
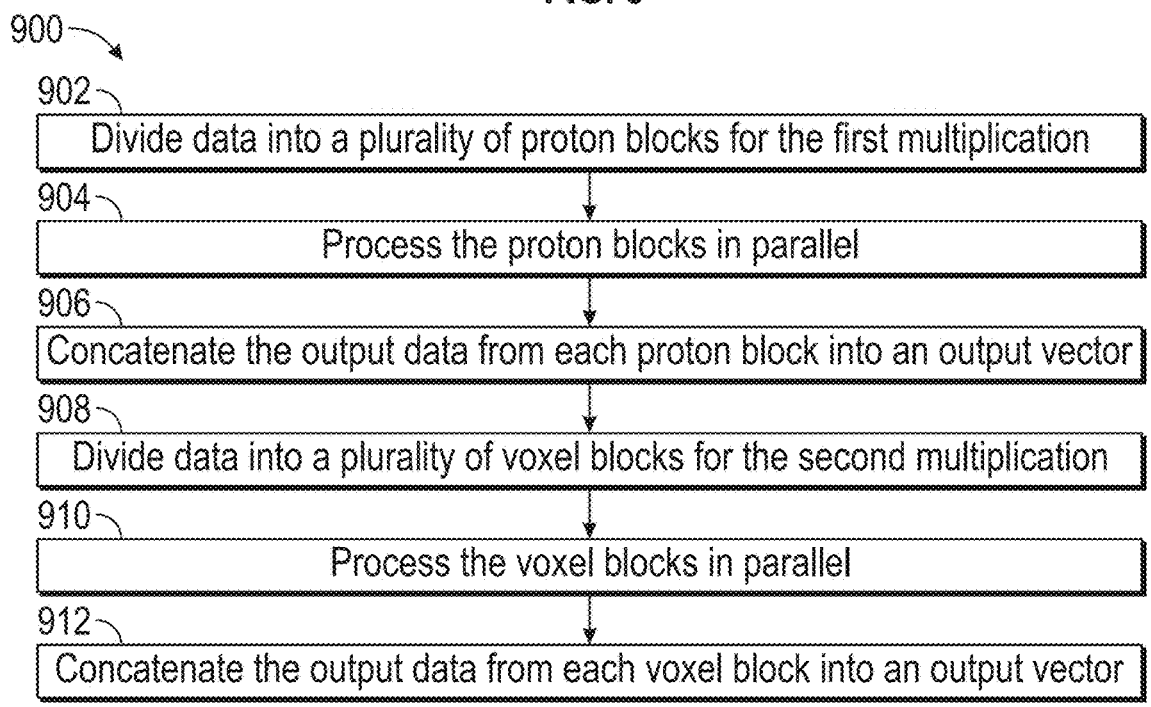
FIG. 9 illustrates an exemplary method for parallel processing, according to embodiments of the disclosure

FIG. 9 illustrates an exemplary method for parallel processing according to embodiments of the disclosure. In some examples, the most straightforward strategy may be performed in a plurality of steps as shown in process 900. In step 902, the data may be divided into blocks of protons for the first multiplication $Av_k$. In step 904, the proton blocks may be processed in parallel, where the blocks may be as small as a single proton. In step 906, the outputs from each of the blocks may be concatenated to assemble an output vector. In step 908, the data may be divided into blocks of voxels for the second multiplication $\overline{A}^T(Av_k)$. In step 910, the voxel blocks may be processed in parallel, where the blocks may be as small as a single voxel. In step 912, the outputs from each of the blocks may be concatenated to assemble an output vector.

In some examples, the blocks may be processed in worker processes, outputs may be assembled in a foreman process, and results evaluated in an executive process. Blocks may further be divided into sub-blocks and a hierarchical system of blocks may help route calculations to multiple GPUs.

Exemplary Coordinated Blocks DV (CBDV)

Figure 10:
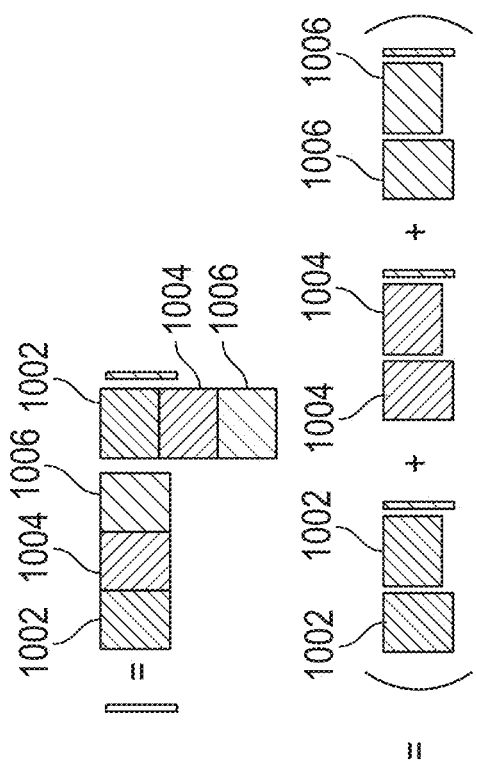
FIG. 10 illustrates a block diagram of an exemplary data blocks representative of protons, according to embodiments of the disclosure.

FIG. 10 illustrates data for different blocks of protons 1002, 1004 and 1006 in the form of matrices. In some embodiments, each block 1002, 1004, and 1006 may include chord length data for different entries in the A matrix. As discussed above, in the A matrix, a row can include data for one proton, and an entry can include more than one rows. For $A^T$, the data for a proton is in a column. The blocks 1002, 1004, and 1005 can represent matrices, with matrix-matrix (or matrix-vector) multiplications multiplying rows from the matrix on the left with a column from the matrix (or vector) on the right. As illustrated in the bottom line of FIG. 10, the entire sequence of multiplications may be carried out independently in different blocks of protons, each with a worker process, and with each block producing output vectors $[Av_k]_t$ and $[\overline{A}^T(Av_k)]_t$. As with RCDV, the foreman process can concatenate the $[Av_k]_t$ vectors into the complete $Av_k$ vector. The complete $\overline{A}^T(Av_k)$ may be a sum over the blocks:

$$\overline{A}^T(Av_k) = \Sigma_t [\overline{A}^T(Av_k)]_t \quad (61)$$

The complete vector may be identical to what would be obtained with the single block shown in the upper portion of FIG. 10 and may be the input to the next iteration.

In some examples, a hierarchy of blocks may be employed. For example, if the system includes 10 GPUs, the data can be divided into one block for each GPU. Within each block, each proton may be processed as a separate sub-block utilizing the parallel processing power of the GPUs, carefully managing the summation of the output vectors from each proton.

Processing each proton independently (blocks of size one proton) may enable major savings in the use of memory. First, there is no need for a list of protons with chord lengths for each voxel. All the needed information is with the list of voxels with chord lengths for each proton, and the output vector needs only the voxels from that proton. Second, the geometry to store this information with much less memory strategies, such as those described above, can be taken advantage of.

Exemplary Independent Blocks DV (IBDV)

In some examples, a method to optimize data processing may be implemented without developing parallel processing architecture such as foreman processes and may provide a convenient method for rapid studies. Protons may be divided into N well-randomized and equal-sized blocks t (the method may be trivially extendable to different sized blocks, as long as the assignment of a proton to a block is random), where each block must include enough protons to find a solution vector (more protons than voxels.) A computer program able to handle a single block of protons may then be run N times in parallel, to produce a solution for each block where the solution may be close to the minimum $\chi^2$ for that block.

In this case, the following may hold within the statistical variability of the data for each block, where the normalization of $\overline{A}^t$ is done using only the protons in that block:

$$\overline{A}^T A \approx \overline{A}^{tT} A^t \quad (62)$$

$\overline{A}^T A$ is a square matrix with dimension equal to the number of voxels, where each entry is a ratio. The numerator and denominator both on average scale linearly with the number of protons. Therefore, each entry is on average independent of the number of protons. From relationship (19), at minimum $\chi^2$, the following relationships are determined:

$$\overline{A}^T A x = \overline{A}^T b \quad (63)$$

$$\overline{A}^T A x = V^{-1} A^T b \quad (64)$$

$$\overline{A}^T A x = \Sigma_t V^{-1} A^{tT} b^t \quad (65)$$

$$\overline{A}^T A x = \Sigma_t V^{-1} V_t \overline{A}^{tT} b^t \quad (66)$$

$$\overline{A}^T A x = \Sigma_t V^{-1} V_t \overline{A}^{tT} A^t x^t \quad (67)$$

$$\overline{A}^T A x \approx 1/N \Sigma_t \overline{A}^{tT} A^t x^t \quad (68)$$

$$\overline{A}^T A x \approx 1/N \overline{A}^T A \Sigma_t x^t \quad (69)$$

Comparing (63) and (69), the average of the solution vectors from the blocks may become:

$$x \approx 1/N \Sigma_t x^t \quad (70)$$

Figure 11B:
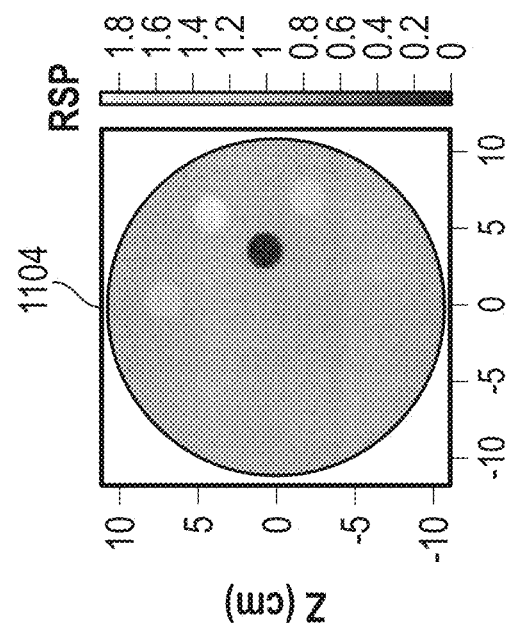
FIG. 11B illustrates an exemplary pCT slice image reconstructed using several independent blocks, according to the embodiments of the disclosure.
Figure 11A:
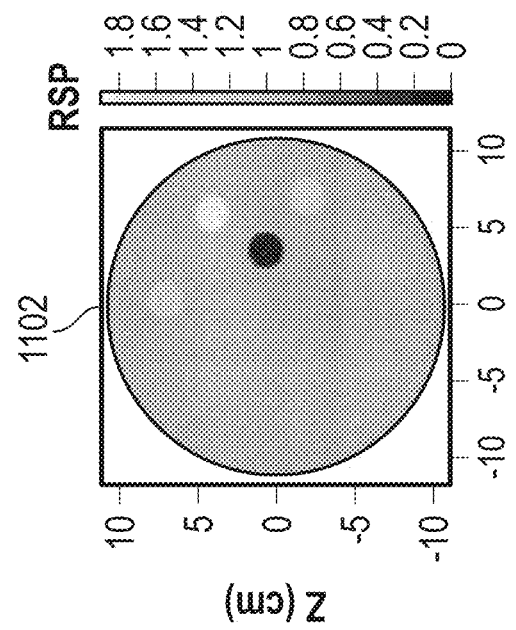
FIG. 11A illustrates an exemplary pCT slice image reconstructed using a single processing block, according to embodiments of the disclosure.

FIG. 11A illustrates an exemplary pCT slice image 1102 reconstructed using a single processing block, according to embodiments of the disclosure. FIG. 11B illustrates an exemplary pCT slice image 1104 reconstructed using several independent blocks, according to the embodiments of the disclosure In some examples, while implementing the above strategies, certain bottlenecks in processing may occur due to limited memory resources, CPU resources, GPU resources, and data transfer capacity. Choice of a suitable strategy may depend on the resources of a particular computing system, and strategy implementation may rely on appropriate design of data structures and software architectures.

Exemplary Computer

Figure 12:
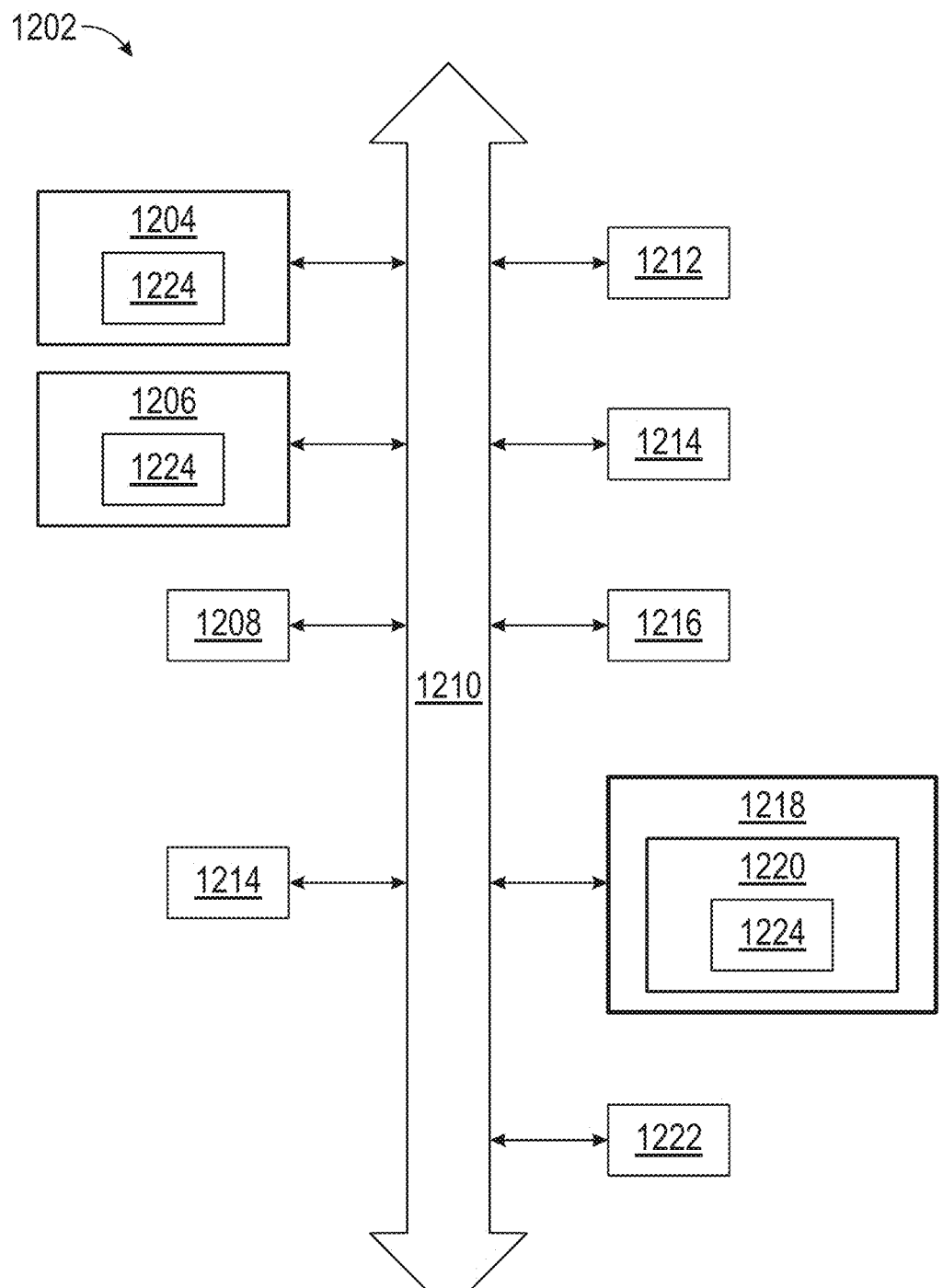
FIG. 12 illustrates a block diagram of an exemplary server computer 1202, according to embodiments of the disclosure.

FIG. 12 illustrates a block diagram of an exemplary server computer 1202, according to embodiments of the disclosure. The server computer 1202 may be a machine such as a computer, within which a set of instructions, causes the machine to perform any one of the methodologies discussed herein, may be executed, according to embodiments of the disclosure. In some embodiments, the machine can operate as a standalone device or may be connected (e.g., networked) to other machines. In a networked configuration, the machine may operate in the capacity of a server or a client machine in a server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, a switch or bridge, or any machine capable of executing a set of instructions (sequential or otherwise) that specify actions to be taken by that machine. A mobile device such as a PDA or a cellular phone may also include an antenna, a chip for sending and receiving radio frequency transmissions and communicating over cellular phone WAP and SMS networks, and a built-in keyboard. Further, while only a single machine is illustrated, the term "machine" shall also be taken to include any collection of machines that individually or jointly execute a set (or multiple sets) of instructions to perform any one of the methodologies discussed herein.

The exemplary computer 1202 includes a processor 1204 (e.g., a central processing unit (CPU), a graphics processing unit (GPU), or both), a main memory 1206 (e.g., read-only memory (ROM), flash memory, dynamic random access memory (DRAM) such as synchronous DRAM (SDRAM) or Rambus DRAM (RDRAM), etc.), and a static memory 1208 (e.g., flash memory, static random access memory (SRAM), etc.), which can communicate with each other via a bus 1210.

The computer 1202 may further include a video display 1212 (e.g., a liquid crystal display (LCD) or a cathode ray tube (CRT)). The computer 1202 also includes an alphanumeric input device 1214 (e.g., a keyboard), a cursor control device 1216 (e.g., a mouse), a disk drive unit 1218, a signal generation device 1220 (e.g., a speaker), and a network interface device 1222.

The drive unit 1218 includes a machine-readable medium 1220 on which is stored one or more sets of instructions 1224 (e.g., software) embodying any one or more of the methodologies or functions described herein. The software may also reside, completely or at least partially, within the main memory 1206 and/or within the processor 1204 during execution thereof by the computer 1202, the main memory 1206 and the processor 1204 also constituting machine-readable media. The software may further be transmitted or received over a network 1204 via the network interface device 1222.

While the machine-readable medium 1220 is shown in an exemplary embodiment to be a single medium, the term "machine-readable medium" should be taken to include a single medium or multiple media (e.g., a centralized or distributed database and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

A method to iteratively reconstruct a proton (pCT) image is disclosed. The method may comprise: determining an A matrix comprising a plurality of chord lengths, the plurality of chord lengths corresponding to one or more proton trajectories through one or more voxels; determining a b vector including one or more water equivalent path length (WEPL) values, the one or more WEPL values corresponding to one or more protons; determining a x vector including one or more relative stopping power (RSP) values, the RSP values corresponding to the one or more voxels; determining a proton deviation vector based on the A matrix, the b vector, and the x vector, wherein the proton deviation vector comprises one or more deviations, the one or more deviations corresponding to the one or more protons; determining a voxel deviation vector comprising one or more entries, the one or more entries corresponding to weighted averages of the one or more deviations of the one or more protons going through the one or more voxels; determining a relaxation parameter; updating the x vector based on the voxel deviation vector and the relaxation parameter; and repeating the steps of determining the proton deviation vector to updating the x vector until a stopping criterion is reached. Additionally or alternatively, in some embodiments, the weighted averages of the one or more deviations of the one or more protons use the plurality of chord lengths as weights. Additionally or alternatively, in some embodiments, the relaxation parameter is determined by minimizing a square of the proton deviation vector. Additionally or alternatively, in some embodiments, the relaxation parameter is determined by setting the sum of the voxel deviation vector equal to zero. Additionally or alternatively, in some embodiments, the relaxation parameter is determined by minimizing a square of the voxel deviation vector. Additionally or alternatively, in some embodiments, the relaxation parameter is determined by setting a mode of the voxel deviation vector equal to zero. Additionally or alternatively, in some embodiments, the stopping criterion is reached when a root mean square of the voxel deviation vector is less than an estimated average voxel precision. Additionally or alternatively, in some embodiments, the determining the proton deviation vector or the determining the voxel deviation vector comprises performing a vector-matrix multiplication. Additionally or alternatively, in some embodiments, the vector-matrix multiplication comprises: dividing data into a plurality of proton blocks, wherein at least one of the plurality of proton blocks includes a single proton; processing the plurality of proton blocks in parallel; concatenating a first plurality of outputs from the plurality of proton blocks to assemble a first output vector; dividing data into a plurality of voxel blocks, wherein at least one of the plurality of voxel blocks includes a single voxel; processing the plurality of voxel blocks in parallel; and concatenating a second plurality of outputs from the plurality of voxel blocks to assemble a second output vector.

A non-transitory computer readable medium is disclosed. The computer readable medium may include instructions that, when executed, perform a method of iteratively reconstructing a proton (pCT) image, the method comprises: determining an A matrix comprising a plurality of chord lengths, the plurality of chord lengths corresponding to one or more proton trajectories through one or more voxels; determining a b vector including one or more water equivalent path length (WEPL) values, the one or more WEPL values corresponding to one or more protons; determining a x vector including one or more relative stopping power (RSP) values, the RSP values corresponding to the one or more voxels; determining a proton deviation vector based on the A matrix, the b vector, and the x vector, wherein the proton deviation vector comprises one or more deviations, the one or more deviations corresponding to the one or more protons; determining a voxel deviation vector comprising one or more entries, the one or more entries corresponding to weighted averages of the one or more deviations of the one or more protons going through the one or more voxels; determining a relaxation parameter; updating the x vector based on the voxel deviation vector and the relaxation parameter; and repeating the steps of determining the proton deviation vector to updating the x vector until a stopping criterion is reached. Additionally or alternatively, in some embodiments, the weighted averages of the one or more deviations of the one or more protons use the plurality of chord lengths as weights. Additionally or alternatively, in some embodiments, the relaxation parameter is determined by minimizing a square of the proton deviation vector. Additionally or alternatively, in some embodiments, the relaxation parameter is determined by setting the sum of the voxel deviation vector equal to zero. Additionally or alternatively, in some embodiments, the relaxation parameter is determined by minimizing a square of the voxel deviation vector. Additionally or alternatively, in some embodiments, the relaxation parameter is determined by setting a mode of the voxel deviation vector equal to zero. Additionally or alternatively, in some embodiments, the stopping criterion is reached when a root mean square of the voxel deviation vector is less than an estimated average voxel precision. Additionally or alternatively, in some embodiments, the determining the proton deviation vector or the determining the voxel deviation vector comprises performing a vector-matrix multiplication. Additionally or alternatively, in some embodiments, the vector-matrix multiplication comprises: dividing data into a plurality of proton blocks, wherein at least one of the plurality of proton blocks includes a single proton; processing the plurality of proton blocks in parallel; concatenating a first plurality of outputs from the plurality of proton blocks to assemble a first output vector; dividing data into a plurality of voxel blocks, wherein at least one of the plurality of voxel blocks includes a single voxel; processing the plurality of voxel blocks in parallel; and concatenating a second plurality of outputs from the plurality of voxel blocks to assemble a second output vector.

A system for 3D proton imaging of an object is disclosed. The system may comprise: a source for generating a pencil beam of protons; a scanning element for steering the pencil beam of protons; a plurality of tracking detectors for generating photons, the photons corresponding to the pencil beam of protons interacting with the object; a residual range detector; and a computing system for receiving signals from the plurality of tracking detectors and the residual range detector, the computing system configured to: determine an A matrix comprising a plurality of chord lengths, the plurality of chord lengths corresponding to one or more proton trajectories through one or more voxels; determine a b vector including one or more water equivalent path length (WEPL) values, the one or more WEPL values corresponding to the pencil beam of protons; determine a x vector including one or more relative stopping power (RSP) values, the RSP values corresponding to the one or more voxels; determine a proton deviation vector based on the A matrix, the b vector, and the x vector, wherein the proton deviation vector comprises one or more deviations, the one or more deviations corresponding to the pencil beam of protons; determine a voxel deviation vector comprising one or more entries, the one or more entries corresponding to weighted averages of the one or more deviations of the pencil beam of protons going through the one or more voxels; determine a relaxation parameter; update the x vector based on the voxel deviation vector and the relaxation parameter; and repeat the steps of determining the proton deviation vector to updating the x vector until a stopping criterion is reached. Additionally or alternatively, in some embodiments, the computing system is further configured to: divide data into a plurality of proton blocks, wherein at least one of the plurality of proton blocks includes a single proton; process the plurality of proton blocks in parallel; concatenate a first plurality of outputs from the plurality of proton blocks to assemble a first output vector; divide data into a plurality of voxel blocks, wherein at least one of the plurality of voxel blocks includes a single voxel; process the plurality of voxel blocks in parallel; and concatenate a second plurality of outputs from the plurality of voxel blocks to assemble a second output vector.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method to iteratively reconstruct a proton (pCT) image comprising:
   determining an A matrix comprising a plurality of chord lengths, the plurality of chord lengths corresponding to one or more proton trajectories through one or more voxels;
   determining a b vector including one or more water equivalent path length (WEPL) values, the one or more WEPL values corresponding to one or more protons;
   determining a x vector including one or more relative stopping power (RSP) values, the RSP values corresponding to the one or more voxels;
   determining a proton deviation vector based on the A matrix, the b vector, and the x vector, wherein the proton deviation vector comprises one or more deviations, the one or more deviations corresponding to the one or more protons;
   determining a voxel deviation vector comprising one or more entries, the one or more entries corresponding to weighted averages of the one or more deviations of the one or more protons going through the one or more voxels;
   determining a relaxation parameter;
   updating the x vector based on the voxel deviation vector and the relaxation parameter; and
   repeating the steps of determining the proton deviation vector to updating the x vector until a stopping criterion is reached.

2. The method in claim 1, wherein the weighted averages of the one or more deviations of the one or more protons use the plurality of chord lengths as weights.

3. The method in claim 1, wherein the relaxation parameter is determined by minimizing a square of the proton deviation vector.

4. The method in claim 1, wherein the relaxation parameter is determined by setting the sum of the voxel deviation vector equal to zero.

5. The method in claim 1, wherein the relaxation parameter is determined by minimizing a square of the voxel deviation vector.

6. The method in claim 1, wherein the relaxation parameter is determined by setting a mode of the voxel deviation vector equal to zero.

7. The method in claim 1, wherein the stopping criterion is reached when a root mean square of the voxel deviation vector is less than an estimated average voxel precision.

8. The method in claim 1, wherein the determining the proton deviation vector or the determining the voxel deviation vector comprises performing a vector-matrix multiplication.

9. The method in claim 8, wherein the vector-matrix multiplication comprises:
   dividing data into a plurality of proton blocks, wherein at least one of the plurality of proton blocks includes a single proton;
   processing the plurality of proton blocks in parallel;
   concatenating a first plurality of outputs from the plurality of proton blocks to assemble a first output vector;
   dividing data into a plurality of voxel blocks, wherein at least one of the plurality of voxel blocks includes a single voxel;

processing the plurality of voxel blocks in parallel; and
concatenating a second plurality of outputs from the plurality of voxel blocks to assemble a second output vector.

10. A non-transitory computer readable medium, the computer readable medium including instructions that, when executed, perform a method of iteratively reconstructing a proton (pCT) image, the method comprising:
  determining an A matrix comprising a plurality of chord lengths, the plurality of chord lengths corresponding to one or more proton trajectories through one or more voxels;
  determining a b vector including one or more water equivalent path length (WEPL) values, the one or more WEPL values corresponding to one or more protons;
  determining a x vector including one or more relative stopping power (RSP) values, the RSP values corresponding to the one or more voxels;
  determining a proton deviation vector based on the A matrix, the b vector, and the x vector, wherein the proton deviation vector comprises one or more deviations, the one or more deviations corresponding to the one or more protons;
  determining a voxel deviation vector comprising one or more entries, the one or more entries corresponding to weighted averages of the one or more deviations of the one or more protons going through the one or more voxels;
  determining a relaxation parameter;
  updating the x vector based on the voxel deviation vector and the relaxation parameter; and
  repeating the steps of determining the proton deviation vector to updating the x vector until a stopping criterion is reached.

11. The non-transitory computer readable medium of claim 10, wherein the weighted averages of the one or more deviations of the one or more protons use the plurality of chord lengths as weights.

12. The non-transitory computer readable medium of claim 10, wherein the relaxation parameter is determined by minimizing a square of the proton deviation vector.

13. The non-transitory computer readable medium of claim 10, wherein the relaxation parameter is determined by setting the sum of the voxel deviation vector equal to zero.

14. The non-transitory computer readable medium of claim 10, wherein the relaxation parameter is determined by minimizing a square of the voxel deviation vector.

15. The non-transitory computer readable medium of claim 10, wherein the relaxation parameter is determined by setting a mode of the voxel deviation vector equal to zero.

16. The non-transitory computer readable medium of claim 10, wherein the stopping criterion is reached when a root mean square of the voxel deviation vector is less than an estimated average voxel precision.

17. The non-transitory computer readable medium of claim 10, wherein the determining the proton deviation vector or the determining the voxel deviation vector comprises performing a vector-matrix multiplication.

18. The non-transitory computer readable medium of claim 17, wherein the vector-matrix multiplication comprises:
  dividing data into a plurality of proton blocks, wherein at least one of the plurality of proton blocks includes a single proton;
  processing the plurality of proton blocks in parallel;
  concatenating a first plurality of outputs from the plurality of proton blocks to assemble a first output vector;
  dividing data into a plurality of voxel blocks, wherein at least one of the plurality of voxel blocks includes a single voxel;
  processing the plurality of voxel blocks in parallel; and
  concatenating a second plurality of outputs from the plurality of voxel blocks to assemble a second output vector.

19. A system for 3D proton imaging of an object, the system comprising:
  a source for generating a pencil beam of protons;
  a scanning element for steering the pencil beam of protons;
  a plurality of tracking detectors for generating photons, the photons corresponding to the pencil beam of protons interacting with the object;
  a residual range detector; and
  a computing system for receiving signals from the plurality of tracking detectors and the residual range detector, the computing system configured to:
    determine an A matrix comprising a plurality of chord lengths, the plurality of chord lengths corresponding to one or more proton trajectories through one or more voxels;
    determine a b vector including one or more water equivalent path length (WEPL) values, the one or more WEPL values corresponding to the pencil beam of protons;
    determine a x vector including one or more relative stopping power (RSP) values, the RSP values corresponding to the one or more voxels;
    determine a proton deviation vector based on the A matrix, the b vector, and the x vector, wherein the proton deviation vector comprises one or more deviations, the one or more deviations corresponding to the pencil beam of protons;
    determine a voxel deviation vector comprising one or more entries, the one or more entries corresponding to weighted averages of the one or more deviations of the pencil beam of protons going through the one or more voxels;
    determine a relaxation parameter;
    update the x vector based on the voxel deviation vector and the relaxation parameter; and
    repeat the steps of determining the proton deviation vector to updating the x vector until a stopping criterion is reached.

20. The system of claim 19, wherein the computing system is further configured to:
  divide data into a plurality of proton blocks, wherein at least one of the plurality of proton blocks includes a single proton;
  process the plurality of proton blocks in parallel;
  concatenate a first plurality of outputs from the plurality of proton blocks to assemble a first output vector;
  divide data into a plurality of voxel blocks, wherein at least one of the plurality of voxel blocks includes a single voxel;
  process the plurality of voxel blocks in parallel; and
  concatenate a second plurality of outputs from the plurality of voxel blocks to assemble a second output vector.

* * * * *